United States Patent
Ramarathnam

(10) Patent No.: US 6,320,286 B1
(45) Date of Patent: Nov. 20, 2001

(54) PORTABLE ELECTRIC TOOL

(76) Inventor: Ramachandran Ramarathnam, 926 TVS Avenue, Annanagar, West Extension, Chennai-600101, Tamil Nadu (IN)

(*) Notice: Subject to any disclaimer, the term of this patent is extended or adjusted under 35 U.S.C. 154(b) by 0 days.

(21) Appl. No.: 09/435,802

(22) Filed: Nov. 8, 1999

(30) Foreign Application Priority Data

Sep. 1, 1999 (IN) ............................................ 868/MAS/99

(51) Int. Cl.$^7$ ............................. H02K 7/14; H02P 54/28
(52) U.S. Cl. ................................ 310/50; 310/47; 318/808
(58) Field of Search .................. 310/46, 47, 50, 310/158, 159, 160, 169, 170; 318/17, 110, 808

(56) References Cited

U.S. PATENT DOCUMENTS

| | | | |
|---|---|---|---|
| 2,773,306 | * 12/1956 | Ranson | 310/50 |
| 3,585,427 | * 6/1971 | Paule | 310/50 |
| 4,437,051 | * 3/1984 | Muto et al. | 318/808 |
| 4,920,702 | 5/1990 | Kloss et al. | 51/170 R |
| 5,042,592 | 8/1991 | Fisher | 173/109 |
| 5,093,593 | * 3/1992 | Philipp | 310/71 |
| 5,123,216 | 6/1992 | Kloss et al. | 51/170 MT |
| 5,170,851 | * 12/1992 | Kress et al. | 173/29 |
| 5,427,188 | 6/1995 | Fisher | 173/205 |
| 5,513,709 | 5/1996 | Fisher | 173/205 |
| 5,739,664 | * 4/1998 | Deng et al. | 318/808 |
| 5,751,069 | * 5/1998 | Rajashekara et al. | 290/40 C |
| 5,939,807 | * 8/1999 | Patyk et al. | 310/89 |
| 6,005,783 | * 12/1999 | Xue et al. | 363/36 |
| 6,081,056 | * 6/2000 | Takagi et al. | 310/89 |

OTHER PUBLICATIONS

J. Holz, "Pulse Width Modulation—A Survey", IEEE Transactions on Industrial Electronics, vol. 39, No. 5, pp. 410–420, 1992.

R.M. Park, "Two—Reaction Theory of Synchronous Machines", AIEE Transacion, vol. 48, No. 1, pp. 716–730, Jul. 1929.

T.G. Habetler, "A Space Vector based Rectifier Regulator for AC/DC/AC Converters", IEEE Transactions on Power Electronics, vol. 8, No. 1, pp. 30–36, 1993.

* cited by examiner

Primary Examiner—Nestor Ramirez
Assistant Examiner—Dang Dinh Le
(74) Attorney, Agent, or Firm—Needle & Rosenberg, P.C.

(57) ABSTRACT

A new series of portable electric tools using high frequency three-phase induction motors with built-in power electronic converter. The tools operate from a single phase AC mains and a built-in power electronic circuitry converts the input supply to a three-phase, higher frequency (200–400 Hz) supply, which is used to drive a three-phase induction motor connected to the gearbox. A microprocessor-based controller, with a novel algorithm, generates three-phase, sinusoidal output waveforms and also provides the soft-start feature for the inverter and the motor. The entire electronics is packaged in a novel way within the housing of the tool itself. The output shaft of the motor, either directly or through a gearbox, can be connected to a wide range of tools like Drills, Grinders, Nut Runners, Screw Drivers, Impact Wrenches, Shears, Nibblers, Saws, Sanders, polishers, etc.

32 Claims, 9 Drawing Sheets

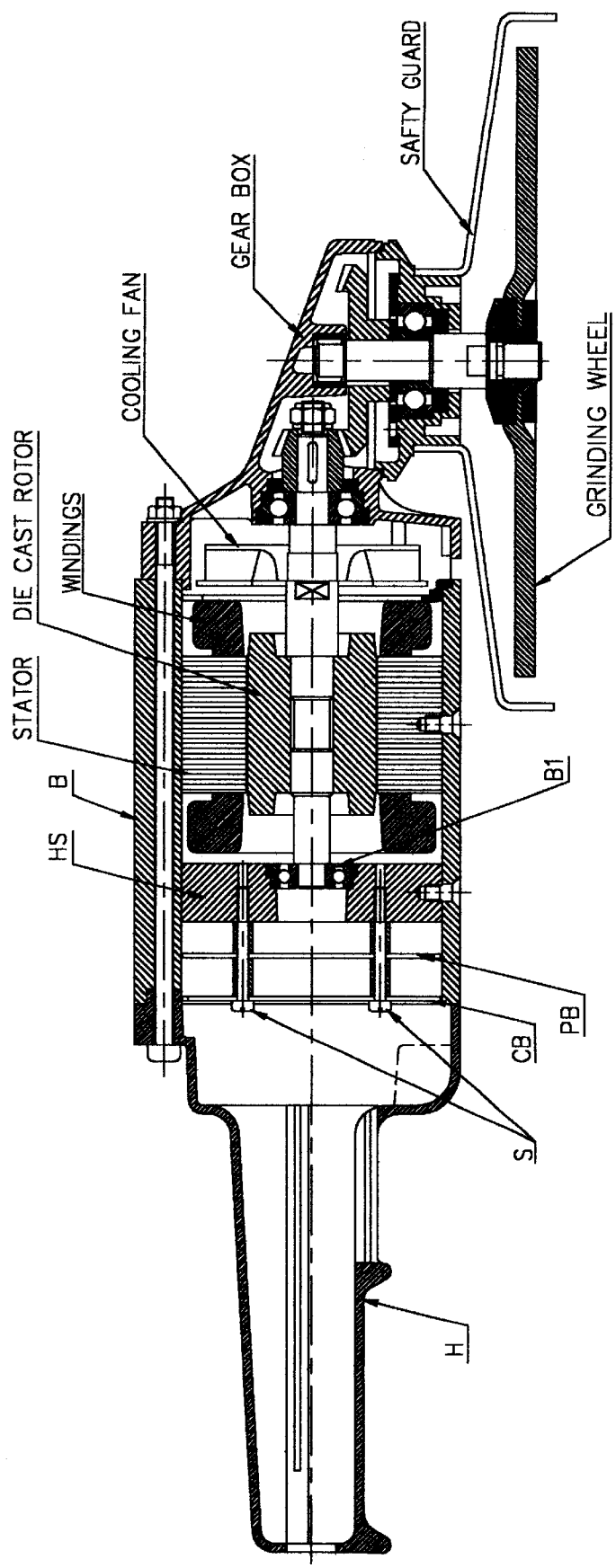
FIG 1 - ANGLE GRINDER

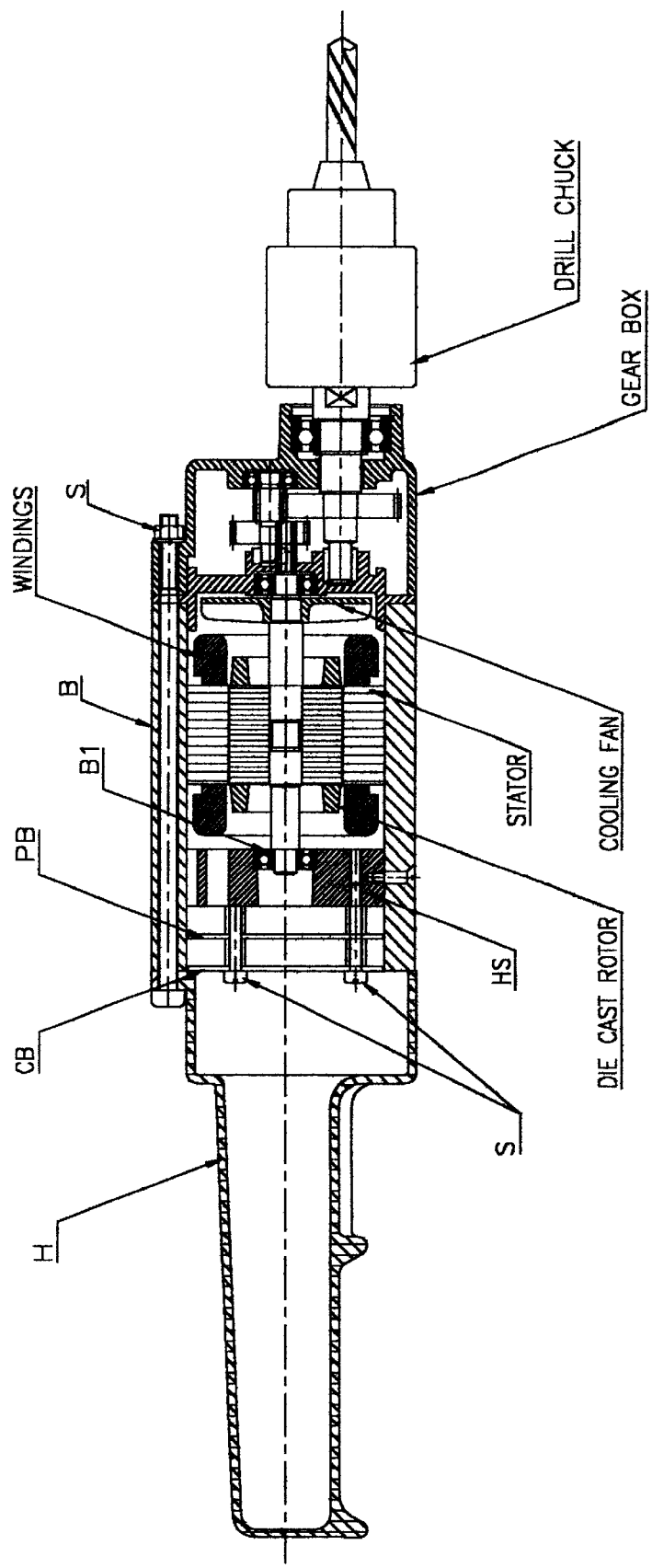
FIG: 2 - DRILL

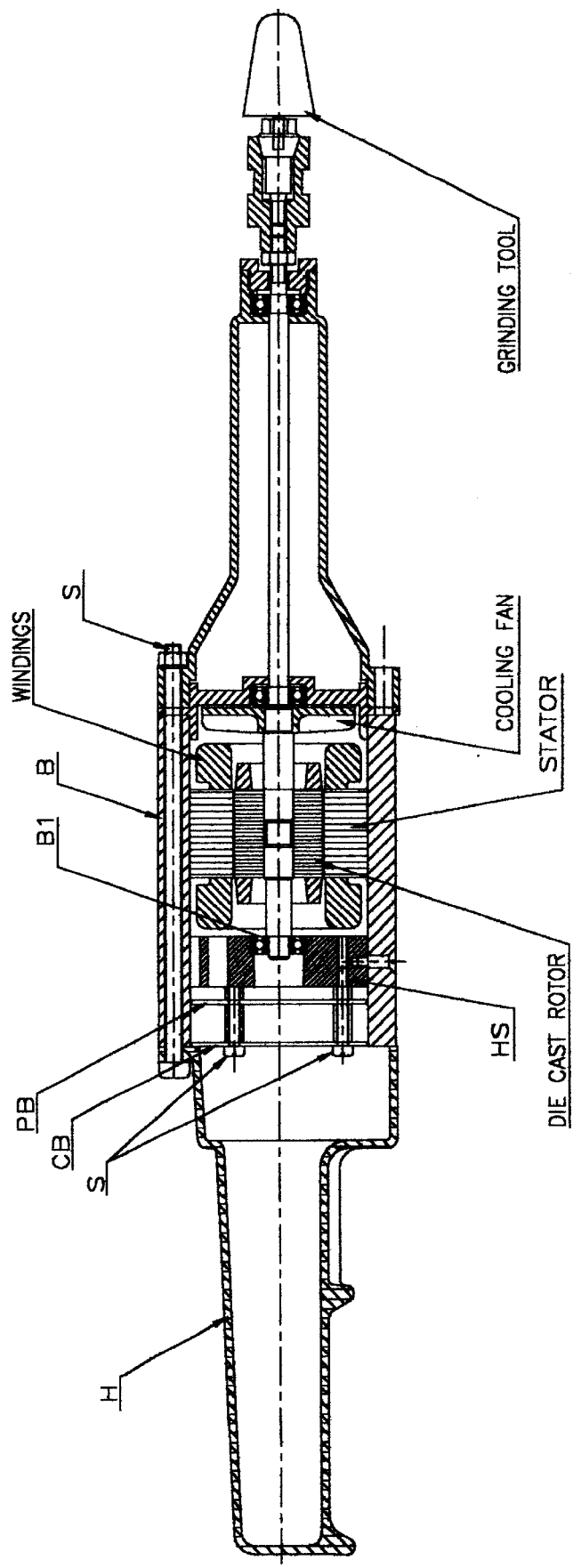
FIG: 3 - DIE POLISHER

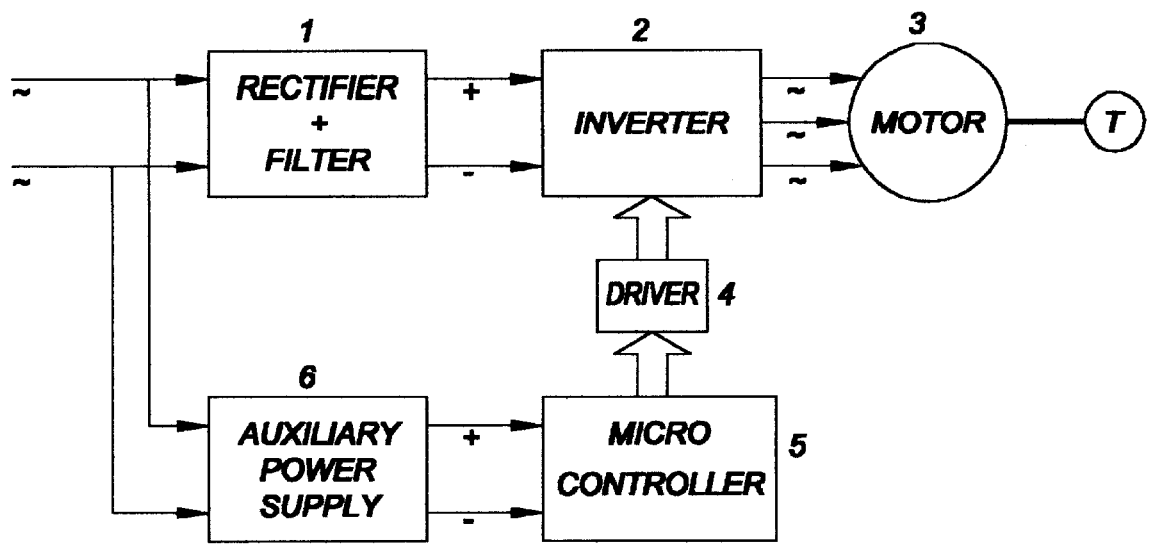
FIG : 4 - Genneral Block Diagram
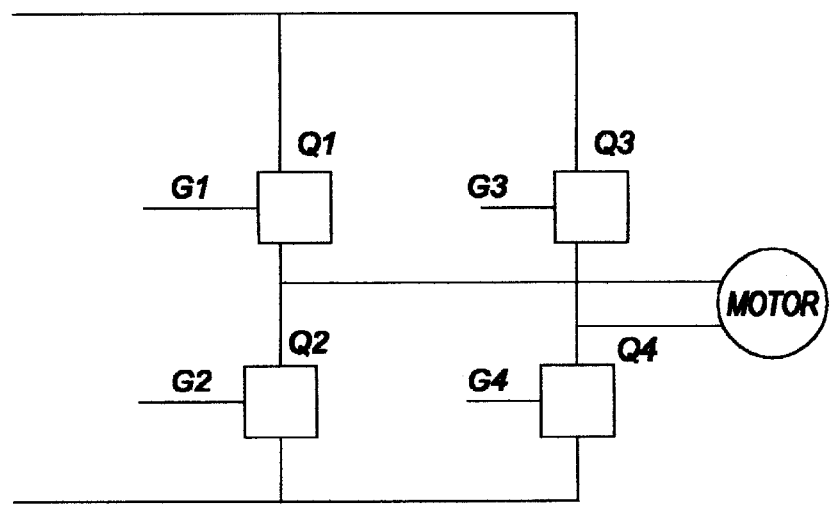
FIG : 5a - (Single Phase Bridge)

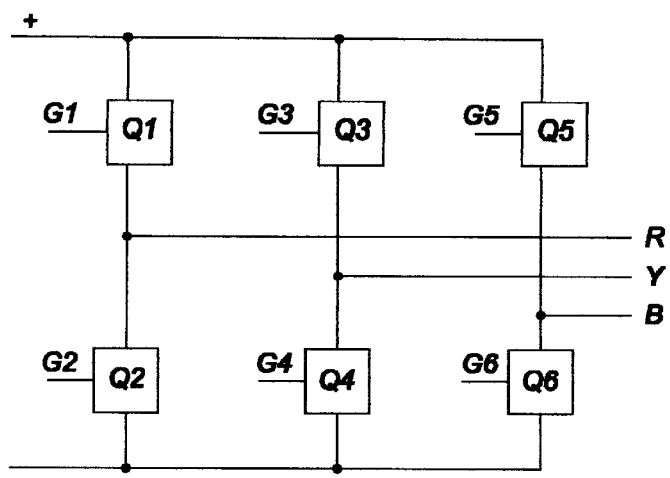
FIG : 5b - Three Phase Inverter
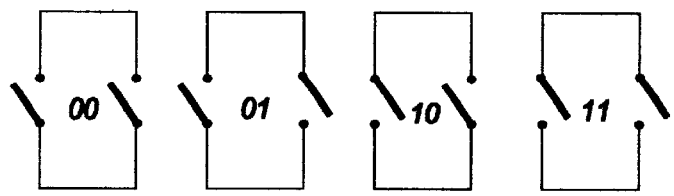
FIG : 6a - (Switching Configuration of single phase bridge)
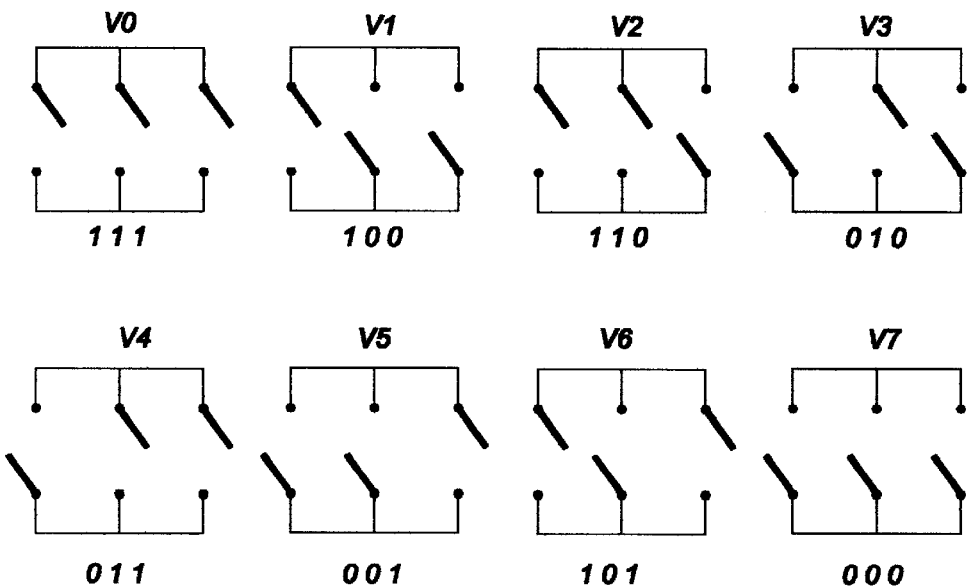
FIG : 6b - Switching Configuration of Pwm 3 Phase Inverter

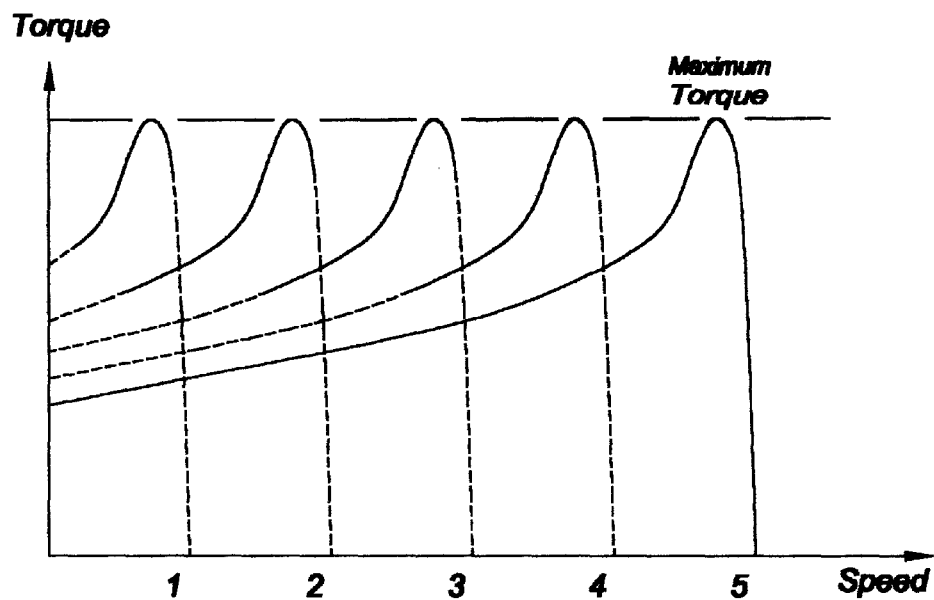
FIG : 7 - Torque Vs Speed during Soft Start
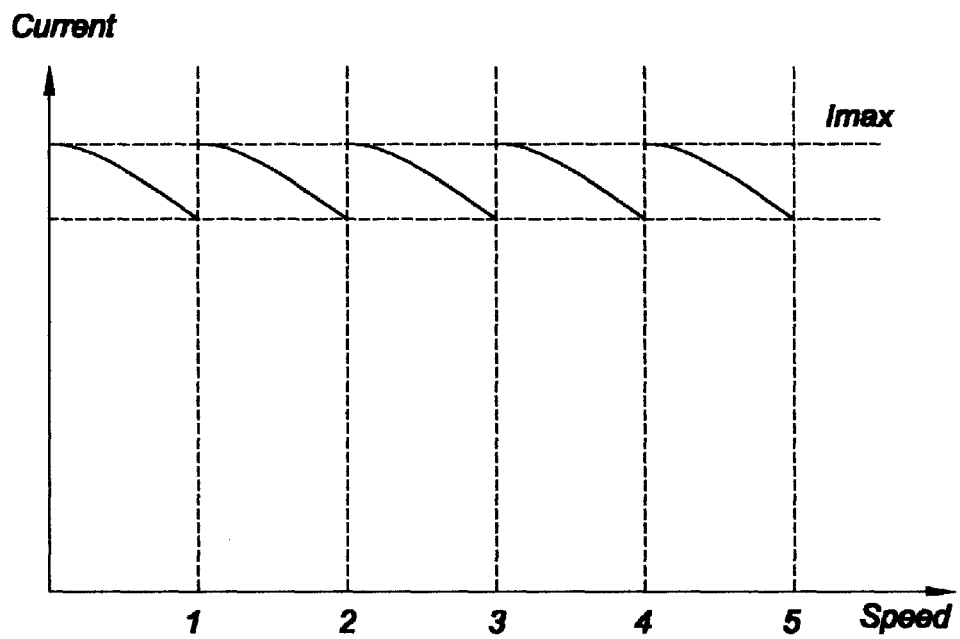
FIG : 8 - Current Vs Speed during Soft Start

FIG : 9 - FLOW CHART
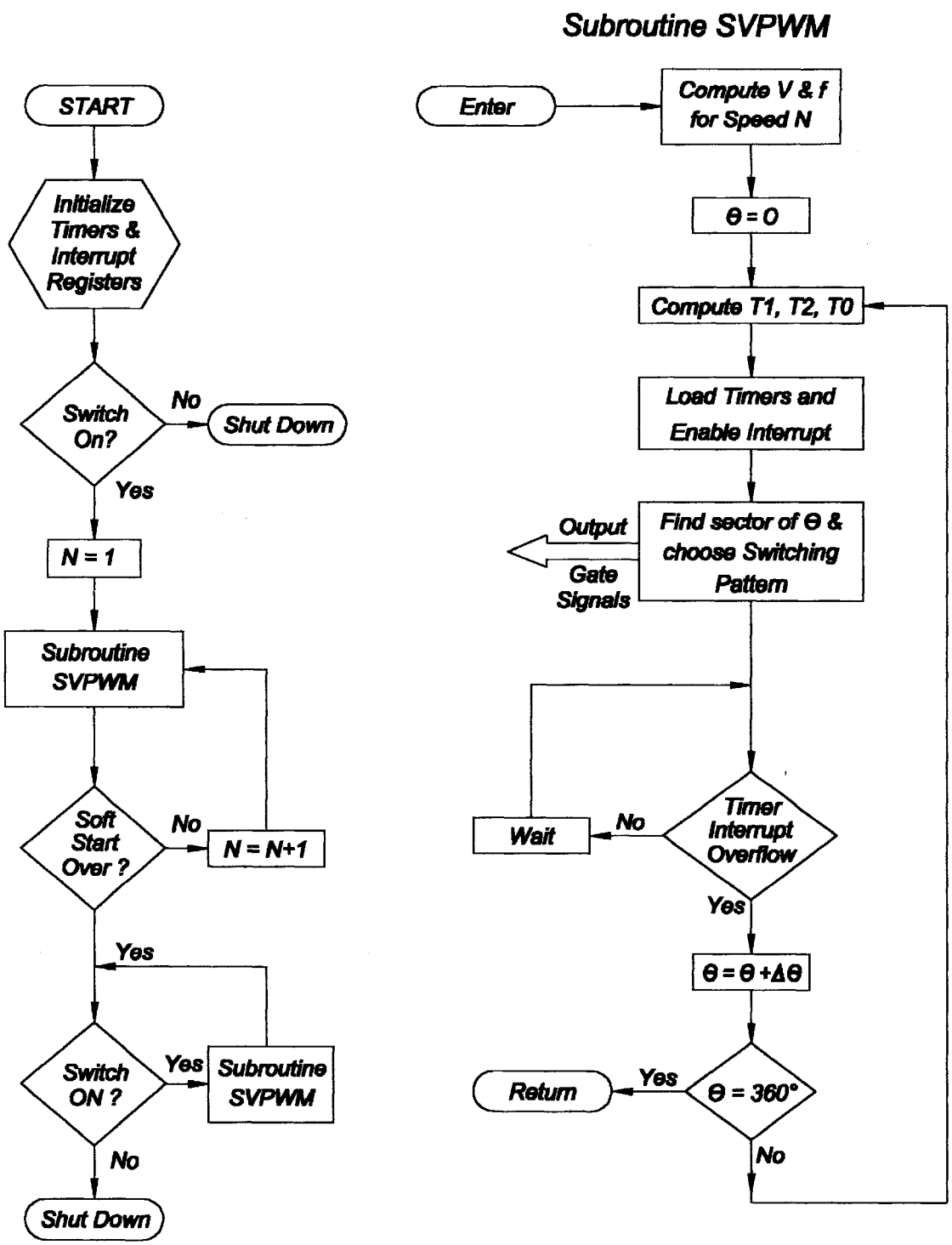

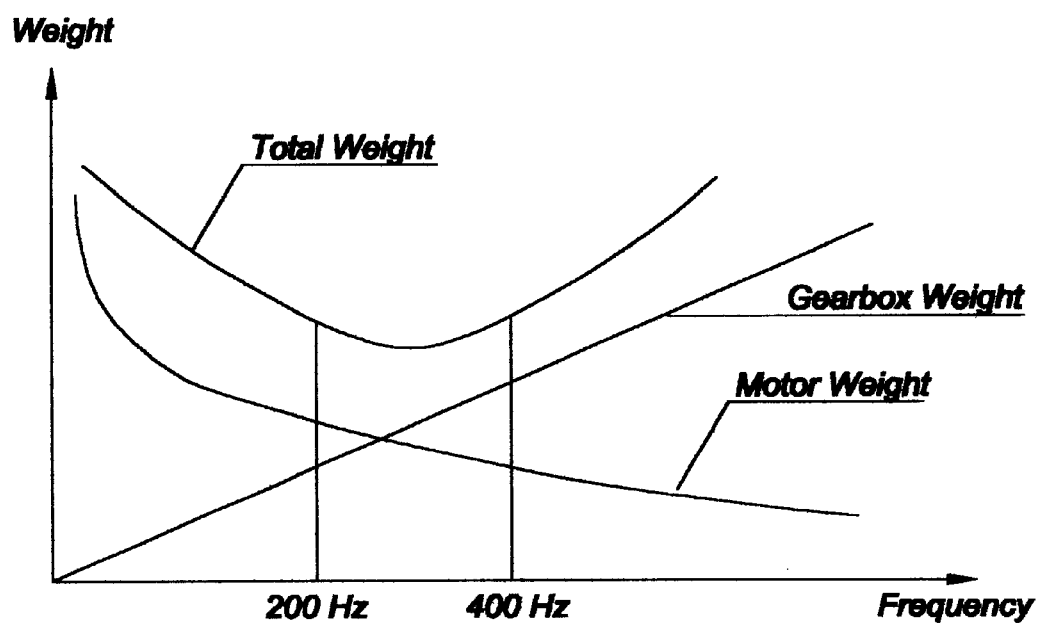
FIG : 10 - Weight Vs Frequency of A Portable Tool

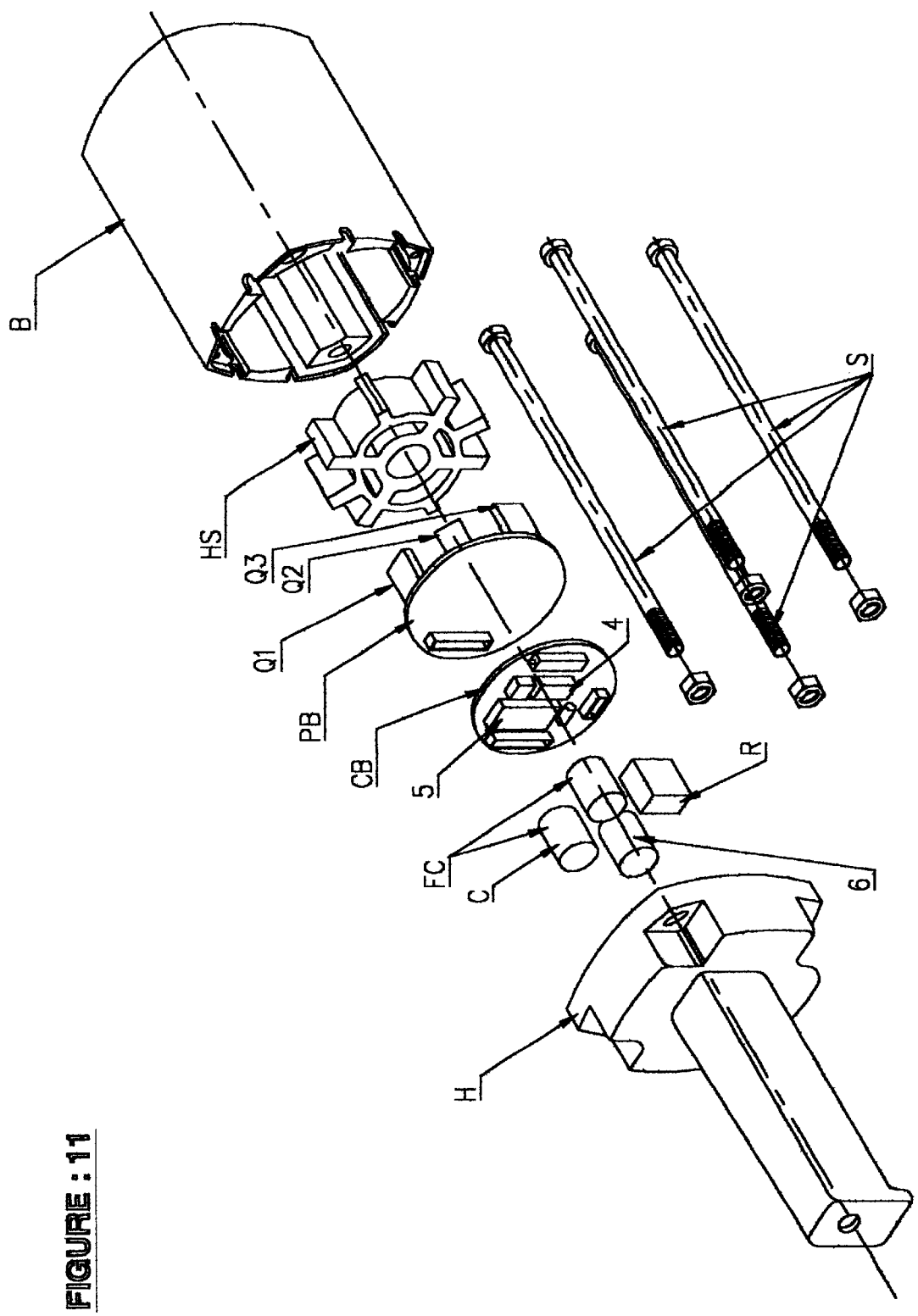
FIGURE: 11

PORTABLE ELECTRIC TOOL

This application claims the benefits of Indian Patent Application No. 868/Mas/99, filed Sep. 1, 1999, which status is pending.

FIELD OF INVENTION

This invention relates to a portable electric tool using AC motor or a brushless DC (BLDC) motor.

BACKGROUND OF INVENTION

It is well known that modern manufacturing techniques deploy a number of portable tools to tackle the repetitive jobs that are encountered in the shop floor of the industry. Tools like drills, grinders, shears, nibblers, screw drivers, nut runners and impact wrenches find extensive use in large fabrication shops, tool rooms, fettling shops and assembly lines. In addition such tools also find large usage as do-it-yourself (DIY) tools in the hands of the individuals in domestic applications. Also such portable tools are widely used in mines particularly in the form of drills. The main requirements of such tools are portability, ease of handling and usage, safety, high efficiency and maximum power output The manufacturer always aims to achieve the maximum power-to-weight ratio in such tools. Nowadays the energy consumed by such tools is also becoming an important criterion for selection.

Presently available range of portable tools can be broadly classified into three types. They are given as under:

AC/DC universal motor based electric tools;

pneumatic tools; and conventional high frequency tools.

The first type mentioned above uses a universal electric motor. These motors are essentially series-wound DC commutator motors that have been specially designed to operate in AC as well. The stator core is invariably laminated to reduce losses. A well-designed universal motor is cheap, lightweight and operatable directly from the AC mains. The fact that it does not require a special power source is a major reason for its widespread use. This type of tool finds extensive use in DIY applications and small shops where one off usage is normal.

The universal electric tools suffer from certain disadvantages in that

The Commutator/Carbon Brush-gear is a perennial source of problem leading to reduced reliability and increased maintenance;

In these motors, the speed drop from no-load to full-load is very high, often of the order of 2:1. Excessive overloads can cause stalling of the motor, leading to armature burnout;

As the motor operates on mains supply, it has to be designed with double-insulation or reinforced insulation with proper earthing, to achieve the required safety levels; and It is difficult to make these tools flameproof for use in mines and other hazardous areas.

Due to these reasons the universal electric tools are generally not preferred for heavy duty, continuous loads and in arduous working environment.

The second type, viz., the pneumatic tools was essentially developed to overcome some of the problems associated with the universal electric tools. The pneumatic tool operates from high-pressure compressed air by means of a simple drive called vane motor. A rotor with vanes supported on bearings runs inside a housing due to the passage of the compressed air and high speeds are achieved. A reduction gearbox is used to reduce the speed and increase the torque. While the pneumatic tool is versatile and absolutely safe, they also suffer from certain disadvantages, as detailed below:

Like universal tools, the pneumatic tools also exhibit steep fall in speed on increasing loads and a tendency for stalling;

They require a centralized compressed-air line, which is expensive and difficult to maintain;

As the pneumatic motor operates best on dry air, free from dust and moisture, each of the tools must be equipped with a FRL (Filter-Regulator-Lubricator) unit;

Over its life, due to continuous ware and tare the pneumatic tool requires regular maintenance, as also the air line;

Even with a well-designed compressor and air line, the pneumatic system is very inefficient. The overall efficiency of the system, as measured by the ratio of the power available at the output shaft of the tool to the input of the motor of the compressor, is very poor compared to the electric system; and The overall systems costs are quite high.

It is mainly to obviate the drawbacks of the universal electric and pneumatic tools that the high frequency (BF) tools were developed. The HF tools employ a three-phase AC induction motor as the prime mover. This motor, with its virtually indestructible die-cast rotor, is very rugged and reliable. Also the motor exhibits a speed-torque characteristic that is totally different from the universal and pneumatic tools. The speed of the induction motor drops very little on the application of the fall load and this results in higher productivity and it is virtually impossible to stall this type of motor by hand.

It is also a known fact that the speed of the induction motor is proportional to the frequency and at the nominal power frequency of 50 or 60Hz that is generally available, the maximum speed that can be achieved from an induction motor is only about 3000/3600 rpm. As the size of an electric motor for a given output is inversely proportional to its operating speed, the size of the motor for a particular output will be higher than that of the universal motor with its high operating speeds. Thus an induction motor operating from the conventional line frequency will be heavy and portability can be achieved only by increasing the frequency of operation of the induction motor.

This type of HF tools made their appearance in the market a few decades ago. As the tools required higher frequency, there was a centralized frequency converter to convert the 50 or 60 Hz, three-phase supply to 200/300/400 Hz three-phase supply. There were separate running power lines to distribute the HF supply to various places in the shop floor. Non-standard electrical accessories in the form of plugs and sockets were used to differentiate them with the standard parts meant for 50/60 Hz usage.

While the HF tools were advantageous from the point of view of reliability, productivity and operational efficiency, they suffered in terms of high cost of installation of the centralized HF converter and distribution system. They were virtually excluded in the one-off usage or DIY applications due the high costs of the high frequency converter and the distribution network. They found their use only in cases where a battery of such tools is applied. Even here, there was the disadvantage that the HF converter had to be switched ON even when only one or a few tools were needed to be operated.

Also both the HF and the pneumatic tools suffer from the handicap that they are not truly portable in the sense that a separate air line or HF line is required for operation of them. And they certainly ruled themselves out in the case of DIY or typical one-off usage in smaller shops.

One of the objects of this invention is to obviate the above drawbacks by utilizing the electronic circuit of a frequency cum phase inverter, as described in my co-pending U.S. patent application filed concurrently for an AC motor or a brushless DC (BLDC) motor within the tool itself, which is incorporated herein by reference.

The second object of the invention is to provide heat sink for the power transistors of the PWM bridge inverter of a high frequency cum phase inverter in the tool.

The third object of the invention is to accelerate the motor in a soft-start mode limiting the in-rush current during starting.

SUMMARY OF THE INVENTION

To achieve these and other objectives, this invention provides a portable electric tool comprising:
- a casing for a motor;
- a non-drive end cover having a bearing at its center for the motor;
- a heat sink provided either integrally or separately on the covers;
- PWM bridge inverter consisting of power transistors with corresponding gates, the output of the PWM bridge inverter is connected to the said motor;
- the power transistors terminals are connected to a printed circuit board (PB) and are mounted on the heat sink;
- the controller unit having a software program of short code length and the driver IC for driving the gates are connected to another printed circuit board (CB);
- the two boards (PB & CB) are inter-connected for determining the timing sequences for generating the signals for switching ON/OFF the gates of the power transistors of the PWM bridge inverter in order to produce variable voltage variable frequency (VVVF), sinusoidal wave forms for controlling the speed of the said motor using space vector pulse width modulation (SVPWM) or sinusoidal pulse width modulation (SPWM) technique, and are mounted through mounting means to the heat sink; and
- a cooling means mounted on the shaft of the motor to first cool the electronics of PB & CB mounted on the heat sink and thereafter cool the stator of the motor;
- an input rectifier and the filter capacitors are connected to PWM bridge inverter, an auxiliary power supply, which provides the power supply to the controller unit and the driver IC are housed in the handle of the tool.

The motor is an AC motor or brushless DC motor. The AC motor is a single-phase motor or a three phase motor or a poly-phase motor. The AC motor is an induction, reluctance or synchronous motor. The brushless DC (BLDC) motor is in two or three phases with two or three pairs of winding.

The PWM bridge inverter (single phase inverter) includes at least 4 power transistors with corresponding gates in case a single-phase motor is connected at its output.

The software program provides no more than four switching configurations of the inverter bridge to produce variable voltage variable frequency (VVVF) sinusoidal voltage wave form for controlling the speed of the single-phase motor using space vector width modulation (SVPWM) or sinusoidal pulse width modulation (SPWM) technique.

The PWM bridge inverter (three-phase inverter) includes at least six power transistors with corresponding gates and the AC motor connected to the output of the PWM bridge inverter is a three-phase motor or brushless DC (BLDC) motor with three pairs of windings (three-phases).

The software program provides no more than eight switching configurations of the inverter bridge to produce variable voltage variable frequency (VVVF) sinusoidal voltage wave form for controlling the speed of the three phase motor using space vector width modulation (SVPWM) or sinusoidal pulse width modulation (SPWM) technique.

Two single phase PWM bridges totaling eight power transistors are provided for BLDC motor with two pairs of winding (two-phase motor), the output of each of these two bridges is connected to the two winding pairs such that the output of second winding is delayed by 90° from the first one.

The software program manipulates switching configurations of the inverter bridge to produce variable voltage variable frequency (VVVF) sinusoidal voltage wave form for controlling the speed of the motor using space vector width modulation (SVPWM) or sinusoidal pulse width modulation (SPWM) technique.

The mounting means includes the mounting screws and the means for cooling is an induced draft fan.

A higher grade silicon steel of reduced thickness is used as core in the motor to reduce the core-losses of the said motor.

The ON/OFF switch of the tool is also incorporated in the handle.

The output shaft of the motor is connected to the gearbox, when required.

The controller is a micro-controller with the associated processor, ROM, RAM and the input/output (I/O ports) having the software program in ROM to produce timing signals through the output port to the gates through the driver IC.

The software program includes soft-start means.

The controller unit provides a multi-speed capability to the motor, if desired.

The power transistors in the PWM bridge inverter are of MOSFET (metal oxide semi-conductor field effect transistor) or IGBT (insulated gate bi-polar transistor) type to make the gate driver circuitry simple.

The heat sink for the power transistors and the non-drive side end cover of the motor have been integrated to achieve optimum utilization of space.

Thermal over-load protection means is provided for the motor windings.

The over-current protection means is provided for the PWM bridge inverter.

The short code length of the program is in the range of 100–1000 bytes, preferably in the range of 200–400 bytes depending upon the number of speed steps required.

The software program in the micro-controller is such that it obtains the maximum utilization of the input DC voltage to the inverter by the implementation of SVPWM technique.

The software program generates a symmetric pattern of timing signals thereby producing variable voltage variable frequency (VVVF) single phase or polyphase sinusoidal wave forms with the least harmonic content.

The software program also includes means to generate dead band in the switching signals to ensure that at no point of time any 2 transistors in the same leg of PWM bridge inverter are conducting simultaneously.

The software program further includes means to obtain the set speed of the motor from the operator console.

The auxiliary power supply means generates the 5V, 15V DC required for powering the micro-controller and the driver IC respectively.

The controller, driver IC and the auxiliary power supply are implemented in an ASIC.

The controller ASIC has means to interface with an external memory chip, if required.

A digital sign wave synthesizer is provided, which generates in real time, a set of single phase or polyphase wave forms as per the Space Vector Pulse Width Modulation (SVPWM) technique.

The controller unit and the passive components are implemented in a hybrid IC.

The invention will now be described with reference to the accompanying drawings.

BRIEF DESCRIPTION OF THE FIGURES OF THE DRAWINGS

FIGS. 1–3 show the general assembly arrangement of three types and sizes of the tools, namely, HF Angle Grinder, HF Drill and HF Die Polisher respectively incorporating a frequency cum phase inverter inside the tool itself according to the invention. The layout of the electrical, electronic circuitry of micro-controller, PWM bridge inverter and mechanical systems are shown therein.

FIG. 4 shows the block diagram of the electronic circuitry of the frequency cum phase converter consisting of the rectifier-filter (1), the three phase PWM bridge Inverter (2), the gate driver IC (4), the motor (3), the microcontroller (5) and the auxiliary power supply (6) for the processor and the gate driver IC.

FIG. 5a a shows PWM single phase bridge inverter consisting of 4 power transistors with corresponding gates for a single phase induction motor.

FIG. 5b illustrates in greater detail the six power transistors, three-phase PWM bridge inverter. R, Y and B are the three phase outputs, QI–Q6 are the power transistors and G1–G6 are the six gates of the transistors.

FIG. 6a illustrates the four possible switching combinations of the four power transistors of the single phase inverter bridge.

FIG. 6b illustrates the eight possible switching combinations of the six power transistors, three-phase inverter bridge. The ON or OFF state of the bottom side power device of the bridge is considered to denote the state of the bridge. The eight possible combinations are $V_0$–$V_7$. $V_0$ and $V_7$ represent the bridge in OFF or non-conducting condition in that either all the three bottom or the top power devices are in ON State. In all the other six states $V_1$–$V_6$, the bridge is in ON State. One or two of the topside devices and two or one of the other bottom side devices are in ON State.

FIG. 7 illustrates the soft-start mechanism. The step by step incrementing of the frequency and speed and the shifting of the maximum torque position is explained therein.

FIG. 8 shows the variation of the current with speed as the motor is accelerated in the soft-start mode. The inrush current is limited to $I_{max}$ during the entire acceleration period.

FIG. 9 illustrates the flow-chart for implementation of the software for the micro-controller. The main program for the Start/Stop control and the subroutine for the implementation of the Space Vector PWM technique is shown therein.

FIG. 10 shows the variations of the weight of the motor and the gearbox with respect to speed. The variation of the complete weight of the tool as a function of the speed is also given.

FIG. 11 shows the exploded view of the portable high frequency (HF) tool and the positioning and packaging of the various sub-assemblies as indicated therein.

DETAILED DESCRIPTION OF THE INVENTION

Referring now to FIGS. 1–3, the general layout of the assembly of tools viz. angle grinder, portable grill and Die Polisher is given. The assembly of the tool is made up of the electronic frequency-cum-phase converter, the stator, die-cast rotor, housing, the gearbox and the output shaft. In the die polisher, shown in FIG. 3, since the full high speed of the motor is required at the output shaft, there is no gearbox. There is also a cooling fan fitted to the motor shaft. The fan sucks the cool air from the ambient, first passing it over the heat sink of the power transistors and then passing it over the stator of the motor.

The packaging of the electronics, viz., the rectifier-filter (1), the printed circuit board (power board) (PB) and the another printed circuit board (controller board) (CB) is done in an innovative manner, as shown in FIG. 11. The heat sink (HS) for the power transistors of the inverter bridge and the non-drive side end cover of the motor have been integrated in a novel fashion to achieve optimum utilization of space. The space inside the handle (H) is also utilized to house the filter capacitors and the auxiliary power supply (6).

The packaging of the electronic circuitry of the frequency cum phase inverter and layout of various sub-assemblies of the tool is displayed in FIG. 11, which is an exploded view of the assembly bringing out the novel features of the assembly. In this view, only the motor (M) and the handle side (H) of the assembly, where the electronic circuitry of the frequency cum phase inverter is packed, is shown. The gear-box side of the tool, where the output shaft of the motor is connected to the gear box and from there to the tool holder is not shown in this figure. The gear-box side of the tool is common for different types. In FIG. 11, (B) is the casing that houses the motor stator, (HS) is the non-drive end cover of the motor with heat sink, which houses the bearing (B1) in the center and has slots at its periphery. This end cover also acts as a heat sink for the power transistors of the PWM bridge inverter (2) and thus has a dual function. (PB) is the power board in which the power transistors of the PWM bridge inverter (single or three phase inverter) are mounted and the power transistors are placed on the corresponding slots of the end cover cum heat sink (HS). (CB) is the control board on which the micro-controller and the driver IC are mounted. Item (C) in FIG. 11 shows the rectifier-filter and the auxiliary power supply (6) and these are housed inside the handle (H). The two boards (PB) and (CB) are interconnected and are mounted through the mounting screws (S) to the heat sink (HS). The ON/OFF switch of the tool is also incorporated in the handle (H). The heat sink for the power transistors and the non-drive end cover of the motor have been integrated to achieve optimum utilization of space. Further, the space inside the handle (11) is also utilized to house the rectifier-filter and the auxiliary power supply.

It is well known that the weight of an induction motor is inversely proportional to its speed of operation. Thus to achieve a high power/weight ratio, it is necessary to increase the frequency of the motor input voltage. However the tip or peripheral speeds of the tool like the drill-bit or the grinding wheel is limited and higher sized tools have to operate at correspondingly lower speeds. Thus there is a need for interposing a gearbox between the motor and the tool and this adds to the weight of the tool itself.

In FIG. 10 the effects of the speed on the weight of both the motor and the gearbox are given. The weight of the motor decreases hyperbolically with the increase in frequency (or speed) while that of the gearbox increases linearly with frequency. The resultant total weight of the tool thus exhibits a trough near 200–400 Hz. And this is generally the range in which the HF motors for power tools are designed and operated.

The core loss of the motor increases with frequency and to reduce the same it is necessary to use higher-grade silicon steel of reduced thickness. But the weight of the motor itself reduces, thereby resulting in cost reduction. Thus there is a trade off between the cost and efficiency of the motor.

In FIG. 4 the frequency-cum-phase converter includes of rectifier-filter (I), the six-power transistors Inverter Bridge (2) (three phase inverter), the micro-controller (5) for generation of the PWM signals through driver IC (4) and the auxiliary power supply (6). The power transistors are of MOSFFT (Metal Oxide Semiconductor Field Effect Transistor) or IGBT (insulated gate bi-polar transistor) type. Since the gate of the transistor is insulated from the other two terminals, source and drain, the design of the gate driver circuitry is made simple. The power transistors are mounted on power board (PB).

The three phase Inverter Bridge is displayed in FIG. 5(b). Q1–Q6 are the six MOSFETs and G1–G6 are the corresponding gates. A high signal at the gate turns the transistor ON and a low signal turns it OFF. The switching signals to generate a sinusoidal, three-phase wave are given by the controller as per the logic of the algorithm. R, Y and B are three-phase outputs, which are connected to the stator windings of the motor.

A gate driver IC (4) is used to drive the gates of the six MOSFETs. The IC provides the right signals for the three lower side transistors Q2, Q4 and Q6 and the signals with the required offset voltages for the three high side transistors Q1, Q3 and Q5. The micro-controller (5) gives the required input signals to this IC (4). The controller also ensures that at no time any or all of the three complementary pairs of transistors Q1/Q2, Q3/Q4 or Q5/Q6 are simultaneously switched ON, lest the DC bus gets short-circuited. The three tools shown in FIGS. 1–3, respectively, have ratings of the inverter varying between 300 W to 1800 W. The input a supply in all these cases is 240 V, 50 Hz, Single-phase.

The controller unit (5) is a microprocessor based one with the associated CPU (Central Processing Unit), ROM (Read Only Memory), RAM (Random Access Memory) and I/O (Input/Output) ports. The main job of the controller unit (5) is to generate switching signals to the six gates G1–G6 of the bridge in a cyclic manner determined by the SVPWM algorithm. This algorithm has been implemented in a novel way and occupies only about 200 bytes long code.

The principle of the SVPWM method of digital synthesis of the three-phase sinusoidal waveform is explained in T. G. Habetler, 'A Space Vector Based Rectifier Regulator For AC/DC Converters', IEEE trans. power electronics, vol VIII, no. 1, pp 30–36, 1993, the disclosure for which is incorporated herein by reference for background information only. The same is explained briefly in the following manner. There are basically eight basic safe switching combinations of the inverter bridge (three phase inverter, as shown in FIG. 6b). In two of them, either all the top or the bottom transistors are ON and their complementary bottom/top transistors are in OFF position. Under both these conditions the bridge is not conducting. There are six other possible combinations in which the bridge conducts, when one or two of the topside transistors is ON and their complementary bottom side transistors are in OFF position. It is to be remembered that at no time, any of the complementary pairs must be ON simultaneously.

Any two of the above switching combinations can represent the sum of the three phase voltages of the stator of the motor at a particular instant. The stator voltage vector is resolved into two of the six possible pairs and the algorithm computes the ON times for each of these two combinations. As this vector moves in time through one cycle, the switching combination and the dwelling times of the corresponding two switching combinations are computed by the algorithm. The switching signals are sent through the output port of the micro-controller to the driver IC and thereon to the gates of the transistors of the inverter bridge. This PWM signals repeat at the desired frequency and the program loops continuously. The program checks for the ON/OFF position of the switch by means of an interrupt routine on a regular basis and once an OFF position is sensed, the bridge is shut down.

There is also an over-current protection for the bridge and whenever this set value is exceeded the bridge is completely shut off by the controller. The controller also ensures that the default position of the bridge is the non-conducting state.

Another novelty of this invention is the soft-start feature that is provided for in the software. When the tool is switched ON, the controller does not set the voltage and the frequency corresponding to the rated values. Instead it sets the values of both V and f at a lower value and the same are increased in steps as per the rules of the soft-start routine to the rated values. The software takes care of this routine also. This feature can be explained in greater detail with the help of FIGS. 7 and 8.

In FIGS. 7 and 8 the soft-start feature with five steps are shown. FIG. 7 shows the Torque vs. Speed curves for the five steps while FIG. 8 illustrates the variation of Current with Speed for the same steps. The inverter and hence the motor is started in step 1 at a low frequency and its corresponding voltage. The starting torque is very high and the starting current is well within the allowed value of $I_{max}$. As the motor accelerates, the speed reaches the value corresponding to step 2. The current value also decreases. At this point both the voltage and frequency are increased. The maximum or pullout torque point is shifted to the right. The motor sees an increase in accelerating torque and the speed further picks up. The current also increases but is kept within $I_{max}$. Similar exercise is carried out at points 3, 4 and 5. The curve relating to step 5 is the Torque Vs. Speed characteristics of the motor at the rated voltage and frequency and the motor follows this curve from the beginning of step 5 and reaches its rated speed.

The motor is started at a frequency $f_1$ and an output voltage $V_1$ corresponding to this, to keep $V_1/f_1$ at the desired constant value. The value of $f_1$ is so chosen as to obtain the maximum torque of the motor at a low value of speed. At this point the current is also much less than the usual high value at starting. As the motor accelerates, the controller changes to another operating point $V_2$ and $f_2$. The motor speed further increases, without any abnormal increase of current. This process is repeated through $V_3/f_3$, $V_4/f_4$, etc., to the rated voltage V and frequency f. At all these points the V/f is kept constant so that the torque developed by the motor is same at all points. At the same time the inrush current during the acceleration is kept within the desired limits. The repetitive peak current carrying capability of the MOSFETs determines this value. Thus the Inverter Bridge is safe even during direct-on-line starting of the power tool.

Another feature of the software is that whenever there is a change of ON/OFF State in the vertical legs of the bridge, it ensures that both the transistors are not turned ON simultaneously. For example the program will change the switching sequence from 100101 to 101001 during the course of the routine. 100101 means that the transistors Q1, Q4 and Q6 are ON and the transistors Q2, Q3 and Q5 are OFF. 101001 means that Q1, Q3 and Q6 are ON and Q2, Q4 and Q5 are OFF. During this transition it can be seen that Q4 is switched from ON to OFF and Q3 is switched from OFF to ON. It is to be noted that the transistor Q4 has an inherent turn-off time, i.e., it takes a definite time for the transistor to completely switch off. It is then essential that the other transistor in the same leg, Q3 be not switched ON before Q4 is turned off completely. This means that there has to be a time delay between the switching OFF of Q4 and the switching ON of Q3. This delay, known as the dead-band, is required whenever there is such a transition. During the dead-band both the transistors of a vertical leg of the bridge are OFF together. The software provides for such a dead-band and the designer can vary the same by giving a different value to a variable.

In FIG. 9 the flow chart for the program is illustrated. As explained earlier the entire code is optimized and occupies only 200 Bytes of the ROM. The processor executes the program residing in the ROM portion of the processor in real-time to generate the gating signals of the inverter bridge as per the SVPWM method. During starting the soft-start routine is executed. Once the frequency and voltage of the inverter have reached the rated maximum values, the program with suitable interrupt routines checks for the OFF position of the ON/OFF switch. Whenever it senses the OFF position the controller shuts down the bridge by keeping Q1, Q3 and Q5 or Q2, Q4 and Q6 in ON state. This is also the case when the over-current protection is activated. Otherwise when the program senses the ON position during the interrupt, the program computes the ON time for the two space vectors and the timer registers of the processor is loaded and another interrupt is enabled. The spatial position, θ of the stator voltage vector is incremented, starting from zero and the switching pattern is sent to the output port for onward transmission to the driver IC. When the timer interrupt overflows, θ is incremented by Δθ and the process repeated, till θ reaches 360. At this point the motor switch position is checked for ON/OFF. Unless an OFF is seen, the program repeats after initializing θ. The program thus can loop indefinitely.

The smoothness of the output sine wave is dependent on and can be varied by changing the value of Δθ. This value, decided by the designer, can be input as variable in the routine. As the memory and execution time requirements of the code is very low, the same can be implemented in a low-end microcontroller resulting in cost savings. Variable speed of the power tool can also be achieved by having a multi-speed switch and depending on the position of this switch, the program can read the corresponding voltage and frequency and generate the timer values for the space vectors. The control for such applications, even when multi-speed is required, is generally of open-loop type and hence the coding is quite simple.

Similar exercise is carried out with PWM bridge inverter (single phase inverter) having four power transistors with four switching configurations, as shown in FIGS. 5a and 6a to provide a multi-speed for a single phase motor. For a single phase motor there are two space vectors and four basic switching combinations. The software program in the microcontroller calculates the dwelling times for each of these configurations and the corresponding dead band program is also inserted in the appropriate place like in the case of three-phase circuit.

A brushless DC (BLDC) motor is similar to poly-phase induction motor in construction except that in the brushless DC motor, the rotor is a permanent magnet instead of die-cast aluminum. Generally, the BLDC motor come in 2 or 3 phases with 2 or 3 pairs of windings and the switching is done in a similar manner as two or three phase motor. While the three phase version is similar to the one, which has been described above, in the two phase motor there are two single phase bridges totaling eight power transistors. The output of each of these bridges is connected to the two winding pairs. The output of the winding is delayed by 90° from the first one. When the voltages are applied in a cyclical fashion to the windings as described above, a rotating magnetic field is setup and the permanent magnet rotor follows this field and revolves continuously.

The motor winding temperature can also be sensed by means of a thermal cutout, which opens, when excess temperatures are encountered in the windings. Thus the motor windings will also be protected. As explained earlier a suitable dead-band can be input to the program as a variable to protect against the short circuit of the DC bus.

One of the advantages in this portable tool is that apart from a single speed, one can have variable speed of the motor, if desired.

What is claimed is:

1. A portable electric tool comprising:
   a. a handle;
   b. casing for a motor;
   c. a non-drive end cover having a bearing at its center for the said motor;
   d. a heat sink provided either integrally, or separately on the covers;
   e. a PWM bridge inverter consisting of power transistors with corresponding; gates, the output of the said PWM bridge inverter is connected to said motor;
   f. power transistors connected to a printed circuit board (PB) and mounted on said heat sink;
   g. a controller unit having a software program of short code length and a driver IC for driving said gates are further connected to a printed circuit board (CB) for driving said gates;
   h. two printed circuit boards (PB & CB), that are interconnected for determining timing sequences for generating signals for switching ON/OFF said gates of said power transistors of said PWM bridge inverter in order to produce variable voltage variable frequency, sinusoidal wave forms for controlling the speed of the motor by using space vector pulse width modulation or sinusoidal pulse width modulation technique, and said printed circuit boards are mounted through mounting means to the heat sink;
   i. a cooling means mounted on a shaft of the motor to first cool the PB & CB printed circuit boards that are mounted on said heat sink and thereafter cool said motor; and
   j. an input rectifier and filter capacitors connected to said PWM bridge inverter, and an auxiliary power supply, which provides the power supply to said controller unit and said driver IC which are housed in said handle of said portable tool.

2. A portable electric tool as claimed in claim 1, wherein said motor is an AC motor or brushless DC motor.

3. A portable electric tool as claimed in claim 1, wherein said AC motor is a single-phase motor or a three-phase motor or a poly-phase motor.

4. A portable electric tool as claimed in claim 1, wherein said AC motor is an induction, reluctance or synchronous motor.

5. A portable electric tool as claimed in claim 1, wherein the brushless DC (BLDC) motor is either a two phase or three phase motor.

6. A portable electric tool as claimed in claim 1, wherein the PWM bridge inverter consists of at least 4 power transistors with corresponding gates.

7. A portable electric tool as claimed in claim 1, wherein said software program provides not more than four switching configurations of said PWM bridge to produce a variable voltage variable frequency sinusoidal voltage wave form for controlling the speed of the single-phase motor using space vector width modulation or sinusoidal pulse width modulation (SPWM) technique.

8. A portable electric tool as claimed in claim 1, wherein said PWM bridge inverter consists of at least six power transistors with corresponding gates and the motor is connected to the output of said PWM bridge inverter is a three-phase motor or brushless DC motor.

9. A portable electric tool as claimed in claim 1, wherein said software program provides not more than eight switching configurations of the PWM bridge inverter to produce a variable voltage variable frequency sinusoidal voltage wave form for controlling the speed of the three phase motor using space vector width modulation or sinusoidal pulse width modulation technique.

10. A portable electric tool as claimed in claim 1, wherein two single phase PWM bridges totaling eight power transistors are provided for brushless DC two phase motor, the output of each of these two bridges is connected to the two phases such that the output of the second phase is delayed by 90° from the first one from the first phase.

11. A portable electric tool as claimed in claim 1, wherein the said software program manipulates switching configurations of the said PWM bridge inverter to a produce variable voltage variable frequency sinusoidal voltage wave form for controlling the speed of the said motor using space vector width modulation or sinusoidal pulse width modulation technique.

12. A portable electric tool as claimed in claim 1, wherein said mounting means are mounting screws.

13. A portable electric tool of claim 1, wherein the means for cooling is an induced draft fan.

14. A portable electric tool as claimed in claim 1, wherein silicon steel of reduced lamination thickness is used as core in said motor to reduce the core-losses of said motor.

15. A portable electric tool as claimed in claim 1, wherein the ON/OFF switch of the tool is incorporated in said handle.

16. A portable electric tool as claimed in claim 1, wherein the shaft of said motor is further connected to the gearbox, when required.

17. A portable electric tool as claimed in claim 1, wherein said controller unit incorporates a micro-controller with a built in processor, ROM, RAM and input/output ports, wherein the software program utilized by the ROM transmits timing signals through said I/O port to the gates by way of said driver IC.

18. A portable electric tool as claimed in claim 1, wherein said software program includes a soft-start means to set the values of voltage and frequency from a lower value to the required values.

19. A portable electric tool as claimed in claim 1, wherein said controller unit utilizes said software to provide a multi-speed capability to the said motor.

20. A portable electric tool as claimed in claim 1, wherein the said power transistors in the PWM bridge inverter are MOSFETs or IGBTs.

21. A portable electric tool of claim 1, wherein the heat sink for the power transistors and the non-drive side end cover of the motor are integrated to achieve optimum utilization of space.

22. A portable electric tool of claim 1, wherein thermal over-load protection means is provided for the motor windings.

23. A portable electric tool as claimed in claim 1, wherein over-current protection is provided in said driver IC for the PWM bridge inverter.

24. A portable electric tool as claimed in claim 1, wherein the short code length of the program is in the range of 200–400 bytes for single speed motor and, 200–1000 bytes for multispeed motor.

25. A portable electric tool as claimed in claim 1, wherein the said software program in the micro-controller is such that it obtains the maximum utilization of the input DC voltage to the inverter by the implementation of Space Vector Pulse Width Modulation technique.

26. A portable electric tool as claimed in claim 1, wherein the said software program generates a symmetric pattern of timing signals thereby producing variable voltage variable frequency single phase or polyphase sinusoidal wave forms with the least harmonic content.

27. A portable electric tool as claimed in claim 1, wherein the software program also includes means to generate dead band in said signals for switching to ensure that at no point of time any two vertical power transistors in PWM bridge inverter are conducting simultaneously.

28. A portable electric tool as claimed in claim 1, wherein said auxiliary power supply means generates the 5V, 15V DC required for powering the micro-controller and the driver IC respectively.

29. A portable electric tool as claimed in claim 1, wherein the controller, driver IC and the auxiliary power supply are implemented in an Application Specific Integrated Circuit.

30. A portable electric tool as claimed in claim 1, wherein said Application Specific Integrated Circuit has a means to interface with an external memory.

31. A portable electric tool as claimed in claim 1, wherein a microcontroller is provided to generate in real time, a set of single phase or polyphase wave forms as per the Space Vector Pulse Width Modulation technique.

32. A portable electric tool as claimed in claim 1, wherein the controller unit and internal passive components are implemented in a hybrid IC.

* * * * *